United States Patent

Rothamel et al.

(10) Patent No.: US 6,708,563 B2
(45) Date of Patent: Mar. 23, 2004

(54) DEVICE FOR MEASURING ROTOR IMBALANCE

(75) Inventors: Karl Rothamel, Ober-Ramstadt (DE); Gottfried Kühn, Weiterstadt (DE)

(73) Assignee: Snap-On Equipment GmbH (DE)

( * ) Notice: Subject to any disclaimer, the term of this patent is extended or adjusted under 35 U.S.C. 154(b) by 0 days.

(21) Appl. No.: 10/169,633

(22) PCT Filed: Dec. 15, 2000

(86) PCT No.: PCT/EP00/12795
§ 371 (c)(1),
(2), (4) Date: Oct. 2, 2002

(87) PCT Pub. No.: WO01/50108
PCT Pub. Date: Jul. 12, 2001

(65) Prior Publication Data
US 2003/0101813 A1 Jun. 5, 2003

(30) Foreign Application Priority Data
Jan. 5, 2000 (DE) .......................... 100 00 235

(51) Int. Cl.⁷ .......................... G01M 1/16; G01M 1/22
(52) U.S. Cl. .......................... 73/460; 73/462
(58) Field of Search .......................... 73/460, 468, 462, 73/458, 469, 470; 318/785, 105, 106, 109, 781, 794, 795

(56) References Cited

U.S. PATENT DOCUMENTS

| 2,161,207 A | 6/1939 | Smith ..................... 161/1 |
| 2,628,334 A | 2/1953 | Weathers ..................... 318/30 |
| 3,916,279 A | 10/1975 | Kawano et al. ............. 318/430 |
| 4,161,680 A | * 7/1979 | Akamatsu ..................... 318/722 |
| 4,423,632 A | 1/1984 | Madden et al. ............... 73/462 |
| 4,467,649 A | 8/1984 | Mueller ..................... 73/462 |
| 4,501,155 A | 2/1985 | Garritano ..................... 73/847 |
| 4,618,805 A | * 10/1986 | Hornung ..................... 318/245 |
| 5,469,040 A | * 11/1995 | Rothamel ..................... 318/785 |

FOREIGN PATENT DOCUMENTS

| DE | 2439609 | 3/1975 |
| DE | 2939133 | 4/1980 |
| DE | 3205630 | 3/1983 |
| DE | 3314287 | 12/1983 |
| DE | 4124285 | 1/1993 |
| EP | 0878575 | 11/1998 |

* cited by examiner

Primary Examiner—Helen Kwok
(74) Attorney, Agent, or Firm—Ostolenk, Faber, Gerb & Soffen, LLP

(57) ABSTRACT

The invention relates to a device for measuring a rotor imbalance. Said device comprises a main shaft which is rotatably mounted in a machine housing and to which the rotor to be measured is fixed, a single-phase alternating-current motor for driving the main shaft, with a single-phase winding (4) and an auxiliary winding (5) which is offset in phase for driving the main shaft (1) up to measurement speed and a control device (17) that adjusts the current of the motor. Said control device (17) has an assembly (8, 6; 7; 20; 22, 23) which reduces the supply current delivered to the two windings (4, 5) of the motor (3; 21) once the measurement speed has been reached, in such a way that the motor creates a reduced torque which substantially compensates a speed drop produced by friction and drag.

11 Claims, 5 Drawing Sheets

DEVICE FOR MEASURING ROTOR IMBALANCE

BACKGROUND OF THE INVENTION

1. Field of the Invention

The invention concerns an apparatus for measuring a rotary member unbalance as is known from DE 41 24 285 A1.

2. State of the Art

The known apparatus has a main shaft which is mounted rotatably in a machine housing and to which a rotary member to be balanced, in particular a motor vehicle wheel, can be fixed. The main shaft is driven by a single-phase ac motor. It has a single-phase main winding and an auxiliary winding which is electrically shifted in respect of phase, in particular by 90°. The pendulum oscillations which occur in the case of a single-phase ac motor, in particular when operating in an approximately load-free condition, are reduced by an oscillator circuit into which the auxiliary winding is incorporated. In contrast to apparatuses in which the drive is switched off or disconnected after the measuring speed is reached, it is possible even without a wheel to check or measure the unbalance of the main shaft and/or the clamping means. In addition in adjusting the apparatus the measuring time and the measuring accuracy are not limited.

SUMMARY OF THE INVENTION

An object of the invention is to provide an apparatus of the kind set forth in the opening part of this specification, in which pendulum oscillations are suppressed, in particular in the approximately load-free mode of operation, over a wide range of preselectable measuring speeds.

In accordance with the invention that object is attained. The invention comprises an apparatus for measuring a rotary member unbalance comprising a main shaft which is mounted rotatably in a machine housing and to which the rotary member to be measured can be fixed, a single-phase ac motor for driving the main shaft with a single-phase main winding and an auxiliary winding which is displaced in phase relationship for driving the main shaft up to a measurement speed and a control device which adjusts the supply current, wherein the control device has a device which when the measurement speed is reached reduces the supply current supplied to both windings of the motor so that the motor produces a reduced torque which substantially compensates for a speed drop caused by friction and air resistance.

Preferably, when the measuring speed is reached, the torque of the motor is not completely switched off but switched over to a first low torque. The magnitude of that first load torque is such that a reduction in speed which is caused by friction, in particular in the drive, or by air resistance of the rotating rotary member, in particular a motor vehicle wheel, is compensated. In that respect the low torque is of such a magnitude that there is a slight rise in speed until an upper speed limit is reached. When the upper speed limit is reached the torque is reduced to a second, somewhat lower value at which the speed slowly falls, or the torque is switched off and, when a lower speed limit is reached, the first reduced torque is switched on again. In that way the measuring speed can be maintained as long as may be desired. The speed of the main shaft can be detected by way of an incremental generator or rotary speed sensor designed in known manner and by means of two-step control it is possible to implement the appropriate setting of the motor current to produce the reduced torque in order to maintain the measuring speed between the upper limit and the lower limit. In that respect, the two-step control provides that the motor current is adjusted to two suitable values which provide for creation of the first and second reduced torque values by the motor in dependence on the upper and lower speed limits. After the measuring run the main shaft is braked to a stop in known manner by reversal of the maximum motor torque. The motor is switched into a current-less condition just before the stopped condition is reached.

The reduction in the torque produced by the motor when the measuring speed is reached can be effected in various ways. For example an electrical resistor which is connected into the supply line of the main winding and the auxiliary winding or can be achieved by a reduction in the voltage in the supply line. The resistor can be in the form of a reactance or an ohmic resistor. Preferably an inductive resistor in the form of a choke is used. That resistor has a low level of inherent heating and provides for sinusoidal current draw, even if harmonics are superimposed on the mains. By means of a relay, it is possible to bridge over the resistor or to apply the full supply voltage again, so that it is possible to switch between reduced and full motor torque. In addition an ac voltage controller, in particular semiconductor-based, which is controlled by pulse width modulation, can be used. A reduced torque can also be achieved by switching in additional motor windings.

The invention can use a four-pole single-phase ac motor which is fed from the mains, in particular a capacitor motor. The torque generated by the motor is transmitted by way of a suitable transmission, for example by way of a belt drive, to the main shaft of the balancing machine. That can be accelerated for example in the limits of between 80 and 210 rpm to a preselectable measuring speed and maintained there, in which case pendulum oscillations of the motor upon reaching the measuring speed are avoided by virtue of the reduction in torque and the above-discussed two-step control. That results in particular from the fact that the motor delivers only a low level of torque and possible pendulum oscillations are reduced, in relation to the reduction in the torque. The mains frequency has practically no influence on the measuring speed. Current consumption and thus the rise in temperature of the motor are reduced as the motor, in particular when using an inductive resistor, always involves a sinusoidal current draw in the current path of the main winding.

Braking of the main shaft is possible by reversing the motor torque so that there is no need for a separate operating brake. In this case it is possible to effect braking into the desired balancing position in the one balancing plane and then turning the rotary member into the balancing position in the other balancing plane. Preferably identical windings are used for the main and auxiliary windings, for that purpose. Measurement of the unbalance of the main shaft and/or the clamping means without a wheel or flywheel mass is possible, with any measuring period. By virtue of the two-point control with a reduced torque, the measuring speed can be maintained for any desired period within close limits (upper and lower speed limits).

BRIEF DESCRIPTION OF THE DRAWINGS

The invention will be described in greater detail by means of embodiments with reference to the Figures in which.

DESCRIPTION OF THE PREFERRED EMBODIMENTS

The embodiments diagrammatically illustrate a main shaft 1 of a balancing machine which in particular is in the form of a wheel balancing machine. Clamped on the main shaft 1 is a rotary member 2 which can be a motor vehicle wheel to be balanced. In order to ascertain the unbalance, the main shaft co-operates with measuring sensors (not shown) connected to an evaluation circuit in known manner.

Figure 3:
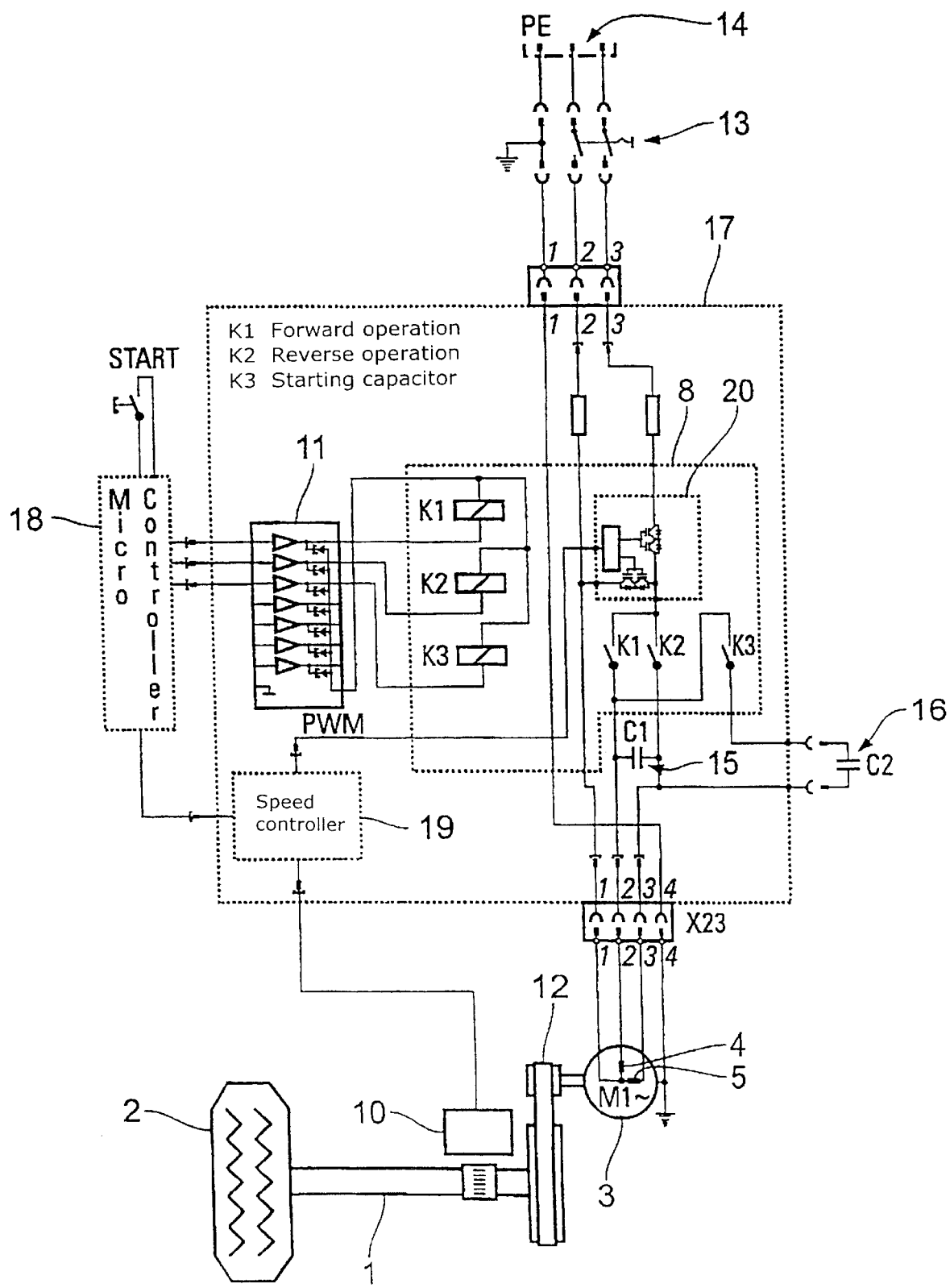
FIG. 3 shows a third embodiment.
Figure 4:
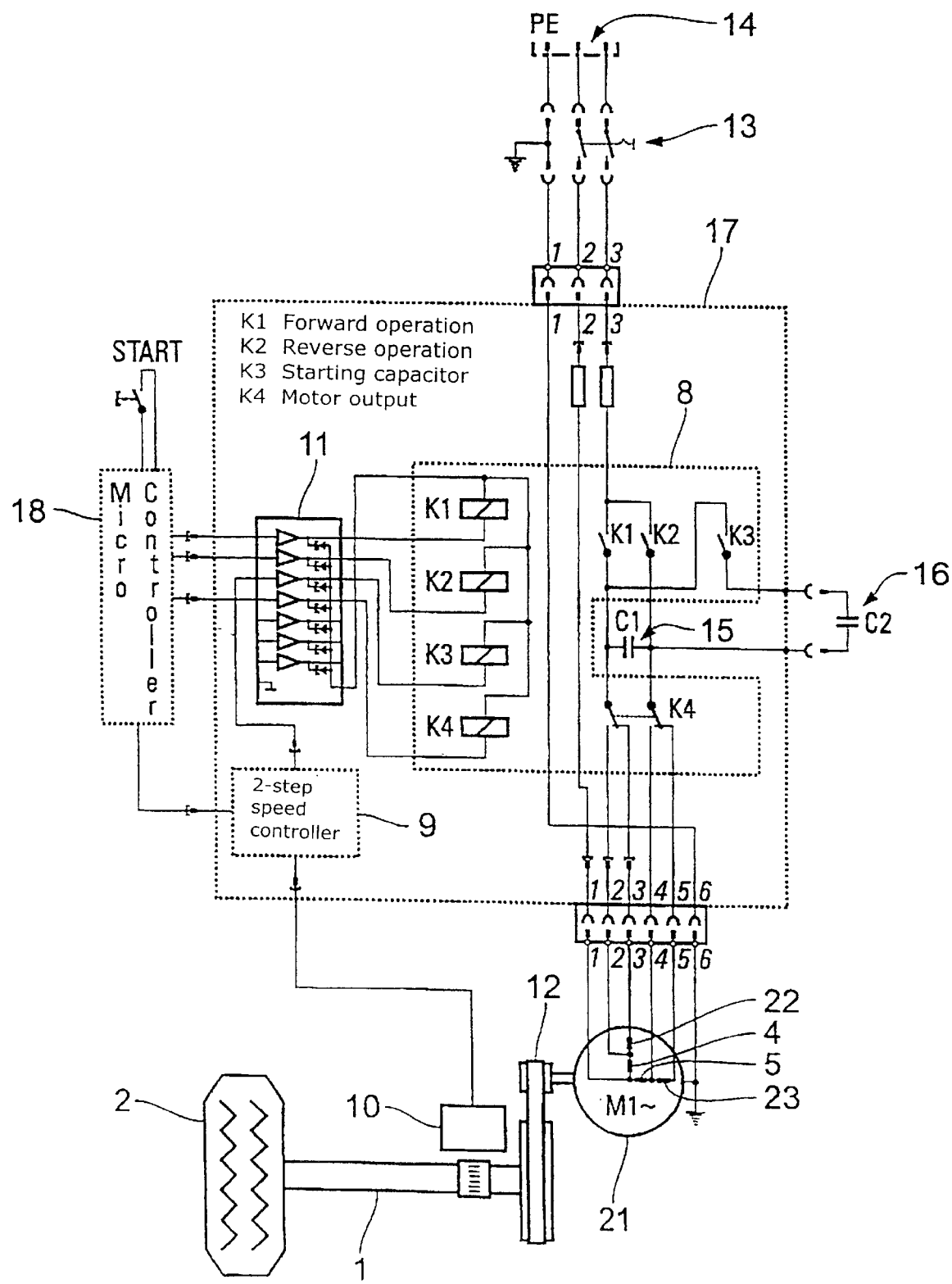
FIG. 4 shows a fourth embodiment.

The drive for the main shaft has a single-phase ac motor 3 (FIGS. 1 through 3) or 21 (FIG. 4). The torque generated by the motor 3 is transmitted to the main shaft 1 by way of a transmission 12. Preferably a belt transmission, in particular a V rib belt is used. Such a transmission permits a change in belt tension whereby the friction which occurs in the belt transmission can be increased or reduced. That makes it possible to influence the rate of rise of the measuring speed, particularly in the case of two-step control in the region of the measuring speed.

The single-phase ac motor 3 preferably has a four-pole stator winding which represents a main winding 4 of the motor. For starting the motor, it has a phase-shifted (in particular through 90°) auxiliary winding 5. The motor 3 can be operated from a single-phase ac mains 14. The main winding 4 and the auxiliary winding 5 are preferably identical windings so that an approximately equal torque is produced in both directions of rotation. In that way the motor can also be used for braking the rotary member 2 after the measuring run. The motor 3 is connected to the mains by means of a mains switch 13. The power supply is effected by way of a motor control device 17 which is described in greater detail hereinafter.

The motor control device 17 has a switching device 8 with switching elements K1 through K4 which can be in the form of relays. There is also a switch control device 11 by which the various switching elements K1 through K4 can be operated or actuated. That actuation takes place in dependence on the speed of the main shaft 1 which is detected by a rotary speed sensor 10 (incremental sensor). The rotary speed sensor 10 is connected to a two-step controller 9 connected to a microcontroller 18 in which the measurement values supplied by the rotary speed sensor 10 are evaluated for two-step control.

Figure 1:
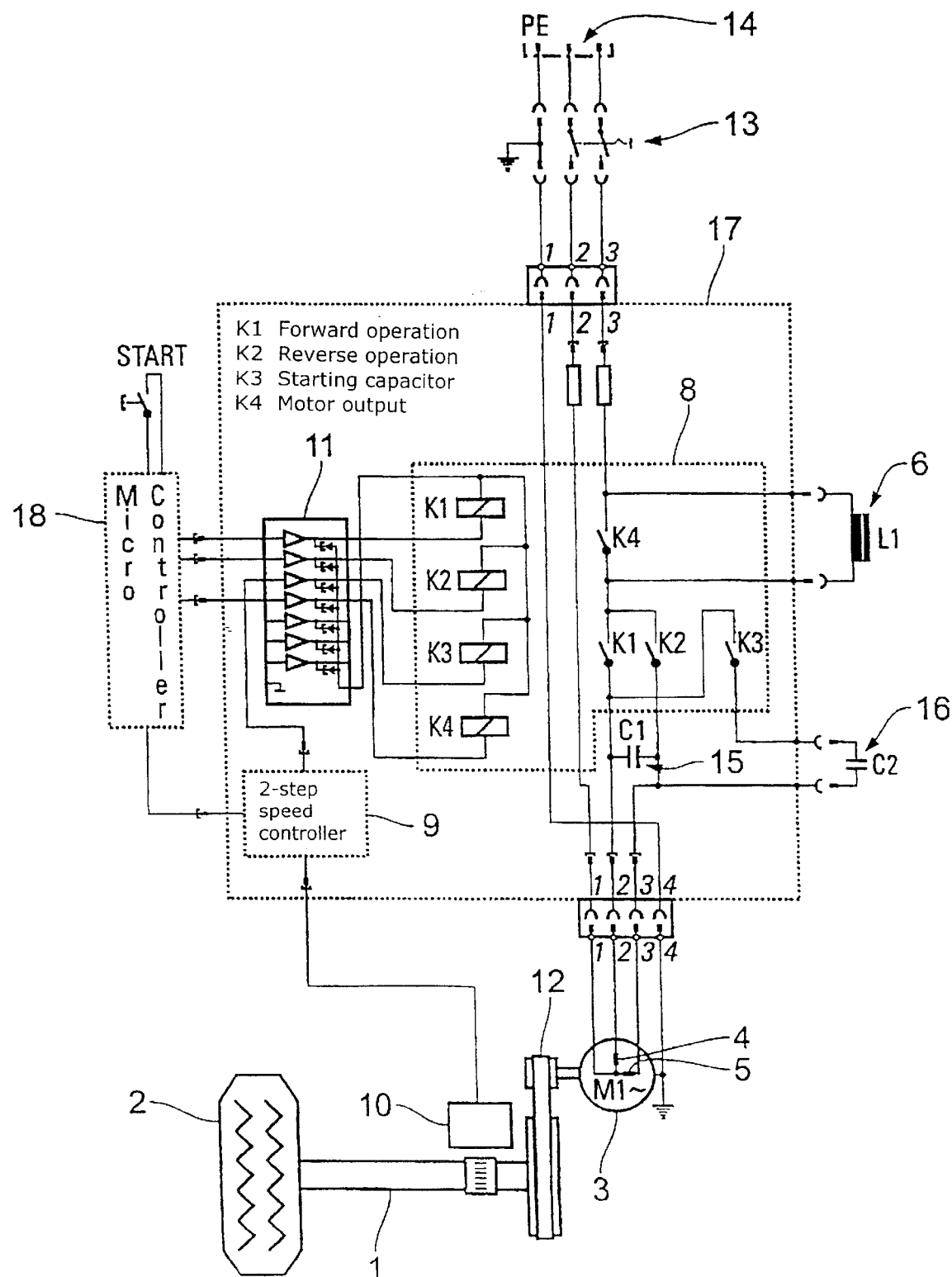
FIG. 1 shows a first embodiment.
Figure 2:
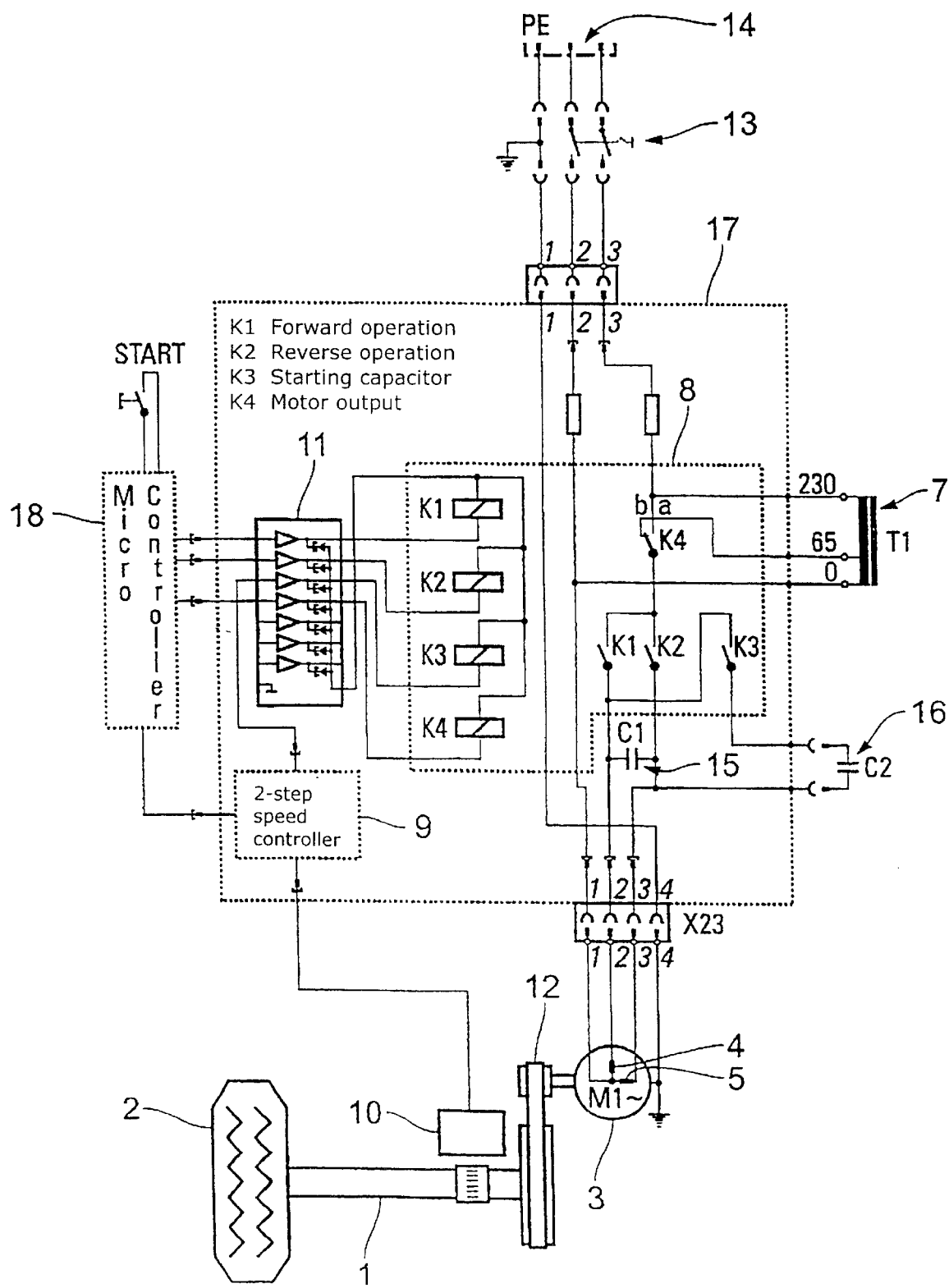
FIG. 2 shows a second embodiment.

The switching elements K1 and K4 of the switching device 8 serve for closing and opening the supply line leading to the windings 4 and 5. The motor torque can be reversed by the switching element K2. A starting capacitor 16 is brought into circuit or taken out of circuit by the switching element K3. In addition, depending on the respective switching contact position, a resistor 6 which can be an ohmic resistor or a reactance (capacitance, inductance) can be connected in series into the supply line leading to the windings 4 and 5 or separated therefrom, by the switching element K4 (FIG. 1). In the embodiment of FIG. 2, depending on the respective position of the switching contact of the switching element K4, the full operating voltage (position a) or a reduced operating voltage (position b) can be applied to the main winding 4 of the motor 3. The reduced operating voltage is taken from a center tapping of a transformer 7.

The mode of operation of the two apparatuses shown in FIGS. 1 and 2 is as follows, wherein operation is described as a slow-speed rotor with an upper speed limit of about 100 rpm and less and as a high-speed rotor with an upper speed limit of about 210 rpm and more.

Upon actuation of a start button firstly the switching elements (relays) K1 and K3 are switched on. In the embodiment of FIG. 1 therefore the resistor 6 is in the supply line to the two windings 4 and 5. In the embodiment of FIG. 2 the switching element K4 is in the switching position b. As a result the reduced supply voltage is applied to the windings 4 and 5. In this case, the winding 5 in both embodiments is supplied with current in phase-shifted relationship by way of the starting capacitor and the operating capacitor 15. The main shaft is firstly driven with a reduced torque. As it is not known for the control electronics whether a rotary member is or is not clamped on the main shaft, the speed rises rapidly. If that is detected by the microcontroller 18 by virtue of the signals supplied by the rotary speed sensor, there is no need to switch on full power, that is to say there is no need for closure of the switching element K4 and therewith bridging of the resistor 6. In the embodiment in FIG. 1 therefore the switching element K4 remains in the opened position illustrated. In the embodiment of FIG. 2 the switching element K4 remains in the initial switching position b.

When braking the main shaft 1, by reversal of the current supplied, the switching element K4 also remains in the initial position, that is to say in the opened position shown in FIG. 1, and in FIG. 2, in the switching position b.

If the speed of the driven main shaft 1 rises slowly or not at all, the embodiment of FIG. 1 provides that the switching element K4 is closed so that the resistor 6 is bridged. That causes the windings 4 and 5 to be supplied to produce full motor output. When a given speed is reached (rated speed) the starting capacitor 16 is switched off by virtue of opening of the switching element K3 so that the capacitor does not hinder a further rise in speed. The main shaft with the rotor clamped thereon (for example a motor vehicle wheel) is accelerated at an approximately constant torque to the measuring speed within a short period of time. The transmission ratio of the transmission 12, in particular the belt transmission, is such that the measuring speed is reached before approaching the synchronous speed and the torque drop linked thereto.

If the balancing machine in the form of a slow-speed rotor measures the unbalance at a low speed of <100 rpm, the switching element K4 in the embodiment of FIG. 1 is opened when the measuring speed is reached so that the resistor 6 is connected into the supply line to the windings 4 and 5. If the balancing machine in the form of a high-speed rotor measures the unbalance at a high speed of >210 rpm, the switching element K1 in the embodiment of FIG. 1 is also opened when the corresponding measuring speed is reached so that the resistor 6 is in the supply line to the windings 4 and 5.

In the embodiment of FIG. 2, for the situation where the rotary member 2 is clamped on the main shaft, the switching element K4 is moved into the switching position a so that the full supply voltage is applied to the windings 4 and 5. When the measuring speed is reached both in the case of the slow-speed rotor and also in the case of the high-speed rotor the switching element K4 is moved back into the switching position b again so that the reduced supply voltage is applied to the windings 4 and 5 of the motor 3.

Due to the resistor 6 in FIG. 1 which in particular is in the form of a choke (inductive resistor) and due to the reduced supply voltage in FIG. 2, which can be delivered from a center tapping of a transformer 6, a reduced torque is produced when the measuring speed is reached by the motor 3. That substantially reduces pendulum oscillations. The torque supplied is made of such a magnitude, by virtue of appropriate dimensioning of the resistor 6 or the reduced supply voltage, that a slight rise in speed is reached when compensating for the friction present in the drive and the air resistance which occurs when the rotary member 2 rotates. That speed rises relatively slowly and is attained by an upper speed limit which can be for example 100 rpm in the case of a slow-speed rotor. That upper speed limit is stored as a comparative value in the microcontroller 18. If the unbalance measuring apparatus operates as a high-speed rotor (measuring speed at about 210 rpm) the upper speed limit lies slightly above that value. The number of revolutions necessary to measure the unbalance is executed in most cases before the upper speed limit is reached so that then, as will be described in detail hereinafter, it is possible to begin with the braking phase by reversal of the motor torque.

If the number of revolutions required for the measurement procedure has not yet been executed when the upper speed limit is reached, the switching element K1 is opened, as shown in FIGS. 1 and 2, and the speed falls. As soon as the lower speed limit is reached the switching element K1 is closed again so that the limited power supply by way of the resistor 6 or the reduced voltage supply to the windings 4 and 5 is set in operation again. As in that situation the motor supplies only a reduced torque resulting pendulum oscillations are considerably reduced.

Control as between the upper speed limit and the lower speed limit in the immediate proximity of the respective measuring speed is effected by the two-step controller 9 in dependence on the speed of the main shaft 1 which is measured by the speed sensor 10 and evaluated by the microcontroller 18, and the switch setting device 11 is suitably actuated. The switch control device 11 actuates or operates the corresponding switching elements K1 through K4 which are preferably in the form of relays.

It is therefore even possible to carry out long-duration measuring runs, as well as measuring runs with a low flywheel mass on the main shaft 1.

When the number of revolutions necessary for measuring the unbalance has been executed the switching element K1 is switched off or opened and shortly thereafter the switching elements K2, K3 and K4 are switched on. In that case the full reversed torque of the motor becomes operative to brake the main shaft 1. Shortly before the main shaft 1 stops all switching elements K1 through K4 are switched off.

The invention provides for smooth operation of the main shaft 1 during the unbalance measuring procedure. As the motor outputs only a low level of torque during unbalance measurement the pendulum oscillations are reduced in relation to the fall in torque. It is possible in particular when measuring the unbalance of the main shaft 1 and the clamping means, that is to say without a flywheel mass or rotary member 2, to carry out a large number of measuring runs. That unbalance measuring procedure can be carried out using any measuring duration. By virtue of the two-step control which is afforded by the co-operation of the microcontroller 18 and the two-step controller 9 in conjunction with the rotary speed sensor 10, it is possible for the measuring speed to be kept within close limits for any period of time.

Braking of the main shaft 1 can be effected by reversing the motor torque so that there is no need for a separate operational brake. It is possible to use a belt drive which produces some friction. That provides that the main shaft is not caused to move by a small static unbalance. As already discussed the friction is overcome with the two-step rotary speed control around the measuring speed by the reduced torque which is supplied in that case by the motor. In addition, when using a belt transmission, the rate of rise of the measuring speed in the post-drive phase during two-step control can be influenced by suitably adjusting the belt tension.

When using a choke as the resistor 6 (FIG. 1) in series with the motor 3 to reduce the torque, the apparatus has the following advantages:

The choke as a reactance has a low level of inherent heating effect and can therefore be disposed in the casing of the electronic system (simple wiring). The choke reduces any harmonics which are possibly superimposed on the mains so that the motor 3 runs with optimum smoothness during the measuring procedure. Suitable chokes are produced in large numbers as a power supply device for fluorescent lamps and are therefore commercially available at low cost.

FIG. 3 shows a further embodiment of the invention in which the device for reducing the motor current has an ac voltage controller 20, in particular semiconductor-based, which is controlled by a controller 19 in dependence on the respective speed of the rotary member 2. Preferably the speed controller 19 is in the form of a pulse width modulator. The ac voltage controller 20 replaces the functions of the switching element K4 and the electrical resistor 6 or the transformer 7 in the embodiments of FIGS. 1 and 2. The other components of the embodiment of FIG. 3 correspond to those in FIGS. 1 and 2 and for that purpose are provided with the same references.

Figure 5:
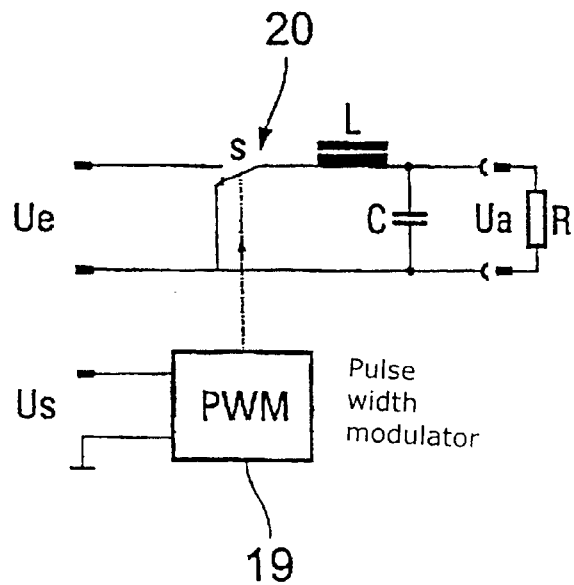
FIG. 5 shows a block circuit diagram to illustrate a component which is used in the embodiment of FIG. 3.
Figure 6:
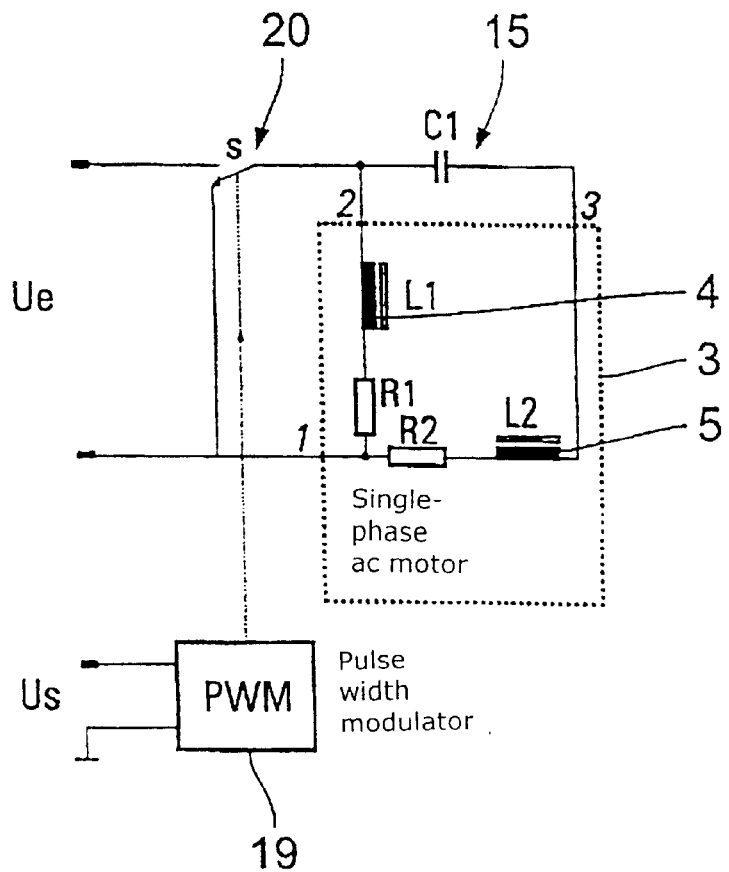
FIG. 6 shows a block circuit diagram to further illustrate the embodiment of FIG. 3.

The mode of operation of the embodiment illustrated in FIG. 3 will be described in detail hereinafter with reference to FIGS. 5 and 6.

The mode of operation of the ac voltage controller is that of a downward converter which is used to reduce dc voltages, as is described for example in U Tietze, C Schenk 'Halbleiter-Schaltungstechnik', Springer-Verlag, 11th edition, pages 979 through 982. The mains voltage 14 (Ue in FIGS. 5 and 6) is transformed at the pulse duty factor of the pulse modulation PWM into the output voltage Ua in accordance with the following formula:

$$Ua = pUe,$$

wherein

P=pulse duty factor of pulse width modulation.

It is therefore possible to produce an output voltage Ua whose mean value, according to the respective pulse duty factor involved, is between the input voltage Ue (mains voltage) and zero. The pulse duty factor of pulse width modulation can be so altered that switching can be effected between the full torque of the motor and the reduced torque when the rotary speed is reached. As in the case of the embodiments of FIGS. 1 and 2 the speed of the rotary member 2 is detected by the rotary speed sensor 10 and the rotary speed regulator 19 which forms the pulse width modulator is implemented by way of the microcontroller 18, after evaluation of the rotary speed. The control voltage Us for the change in pulse duty factor of pulse width modulation is set in dependence on the speed of the rotary member as detected by the rotary speed sensor 10. As in the case of the embodiments of FIGS. 1 and 2 the measuring apparatus can be operated in the form of a slow-speed rotor or a high-speed rotor. When the respective measuring speed is reached the pulse duty factor of pulse width modulation is altered or reduced to such an extent that the motor produces the reduced torque. In that case the value of the supply current which is set by pulse width modulation and thus the reduced torque supplied by the motor can be of such magnitudes that the rotary speed slowly rises to the upper speed limit and is then reduced again until the speed reaches the lower speed limit. The pulse duty factor of pulse width modulation is suitably altered to regulate the rotary speed between those two limits. That makes it possible to embody a PID-regulator.

As can be seen in particular from FIG. 5 the basic components of the ac voltage converter are formed as follows. The power switch S is formed by a power switch preferably on a semiconductor basis. The storage choke L and the consumer R are formed by the motor. The operating capacitor acts at the same time as a smoothing capacitor C. FIG. 6 shows for the consumer R the circuit diagram of the motor 3 with the two windings 4 and 5 (L1, L2) which are of the-same design configuration.

As the voltage at the motor 3 is adjustable during operation by way of pulse width modulation, it is possible to compensate for influences of the mains frequency and the mains voltage on the torque of the motor 3. A pulsating dc voltage which is adjustable in amplitude can be applied to the motor with the ac voltage controller 20 by actuation only during one half wave of the mains voltage. In that way a braking torque can be produced when the motor is rotating. No torque is produced when the motor is stopped. In that way it is possible to implement a positional brake for easily finding the balancing position or rotation of the rotary member into the balancing position, without involving additional expenditure, as, prior to the switching operation, the output voltage of the ac voltage controller can be brought to zero, the relays K1 and K2 can be switched without sparking. It is also possible to avoid overloading the motor by detecting the temperature of the windings. That can be effected by applying a dc voltage to one of the motor windings and detecting the ohmic resistance thereof.

In the embodiment shown in FIG. 4 in which components which act in the same manner are also provided with the same references as in the above-described embodiments, the apparatus uses a single-phase ac motor which has additional windings 22 and 23. The winding 22 can be connected in series with the main winding 4 and the winding 23 can be connected in series with the auxiliary winding 5. For acceleration of the motor to the measuring speed, firstly the windings 4 and 5 are supplied with power, as in the above-described embodiments. As soon as the measuring speed is reached the additional windings 22 and 23 are cut in in order to produce the reduced torque. Speed regulation in the region of the measuring speed is then effected in the same manner as in the embodiment of FIG. 1, more specifically by cutting the additional windings 22 and 23 into and out of circuit by means of the two-step control action of the two-step controller 9.

What is claimed is:

1. Apparatus for measuring a rotary member unbalance comprising a main shaft which is mounted rotatably in a machine housing and to which the rotary member to be measured can be fixed, a single-phase ac motor operating from a supply current for driving the main shaft, the motor having a single-phase main winding, an auxiliary winding which is displaced in phase relationship from the main winding for driving the main shaft up to a measuring speed, a control device which adjusts the supply current to the windings, the control device includes a supply current-reducing device which when the measuring speed is reached, reduces the supply current supplied to both windings of the motor so that the motor produces a reduced torque which substantially compensates for a drop in speed caused by friction and air resistance.

2. Apparatus as set forth in claims 1 wherein the device for reducing the supply current is operable to
    adjust the supply current when the measuring speed is reached for a rise in speed up to an upper speed limit to a first value for producing a first reduced torque,
    adjust the supply current the upper speed limit is reached for a drop in speed to a lower speed limit to a second value for producing a second reduced torque, and
    again adjust the supply current to the first value when the lower speed limit is reached.

3. Apparatus as set forth in claim 1 wherein the supply current-reducing device is controlled by a two-step controller which is set in dependence on the rotary member speed.

4. Apparatus as set forth in claim 1 wherein the main and the auxiliary windings are substantially identical windings.

5. Apparatus as set forth in claim 1 wherein the device for reducing the supply current is an ohmic resistor or reactance.

6. Apparatus as set forth in claim 5 wherein the reactance is an inductance.

7. Apparatus as set forth in claim 1 wherein the device for reducing the supply current is in the form of a transformer.

8. Apparatus as set forth in claim 1 wherein the device for reducing the supply current is in the form of an ac voltage converter.

9. Apparatus as set forth in claim 8 wherein the ac voltage converter is a semiconductor ac voltage converter which is controlled by pulse width modulation in dependence on the speed of the rotary member.

10. Apparatus as set forth in claim 1 further comprising additional windings, wherein when the measuring speed is reached, the additional windings are added to the main and auxiliary windings to reduce the torque produced by the motor.

11. Apparatus as set forth in claim 6 wherein the reactance is a choke.

* * * * *